UNITED STATES PATENT OFFICE.

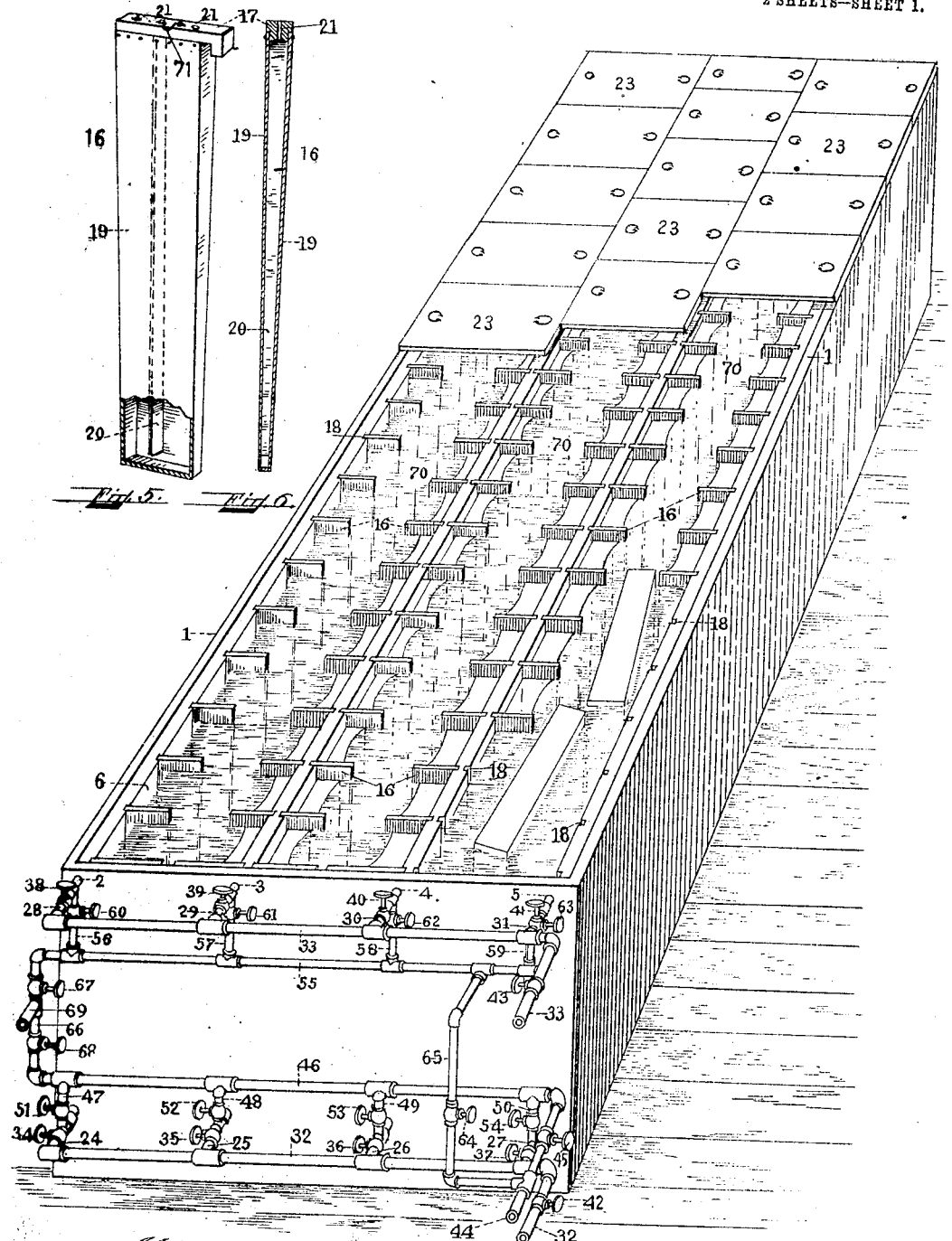

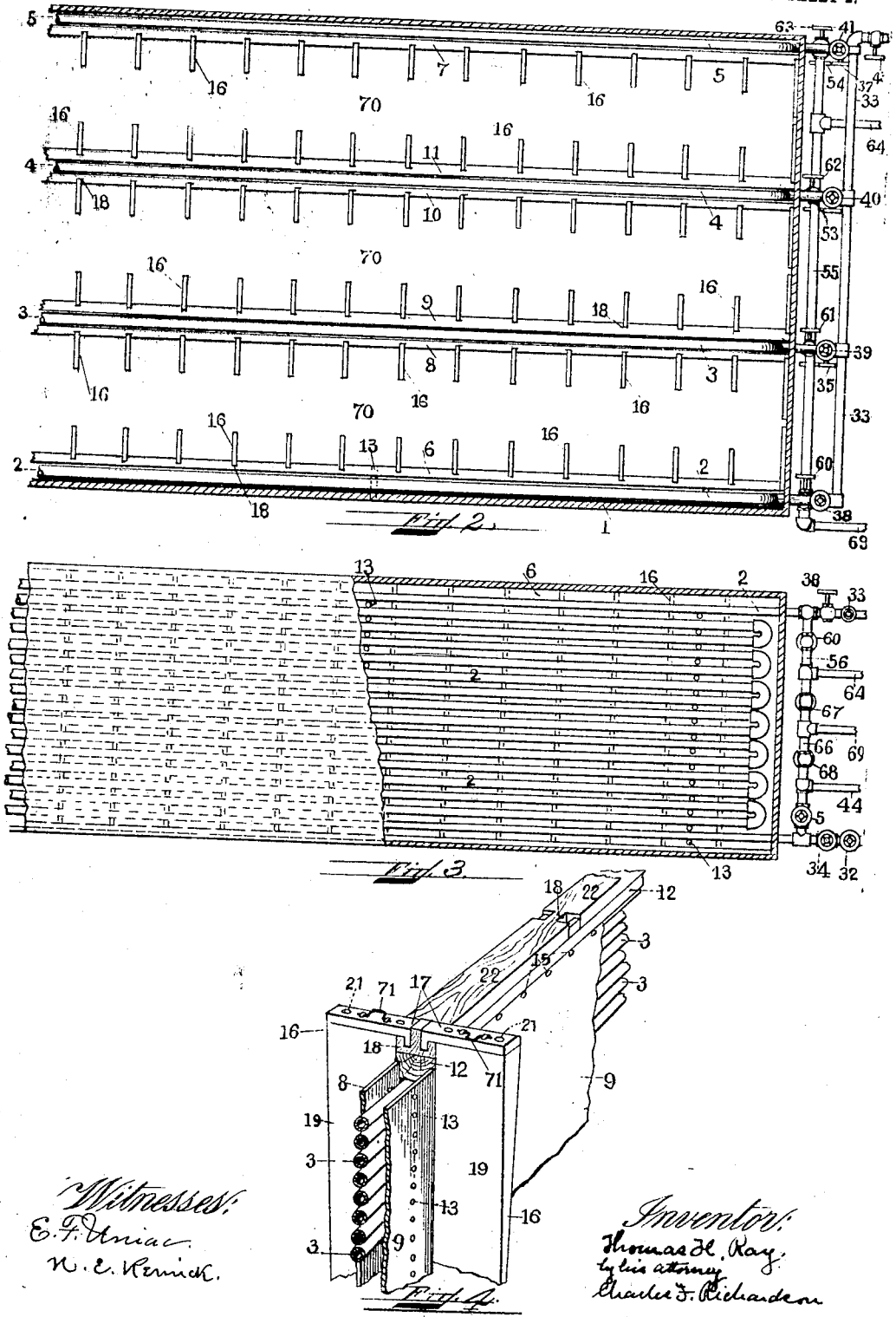

THOMAS H. RAY, OF SOMERVILLE, MASSACHUSETTS.

ICE-MAKING MACHINE.

No. 876,015.　　　Specification of Letters Patent.　　　Patented Jan. 7, 1908.

Application filed March 1, 1907. Serial No. 360,027.

*To all whom it may concern:*

Be it known that I, THOMAS H. RAY, a citizen of the United States, residing at Somerville, in the county of Middlesex and State of Massachusetts, have invented certain new and useful Improvements Relating to Ice-Making Machines, of which the following is a specification, reference being had therein to the accompanying drawing.

Where artificial ice is made from spring water, which has not been distilled, the water is constantly agitated, so that the ice formed will be clear and when formed, either one of two methods is employed for "harvesting" it, that is, for cutting it up into cakes of proper size for use. One method is known as the "plate method", and may be said to consist of the following general operations. The ice is frozen in one long piece, detached from the surface upon which it is frozen, lifted in one piece out of the water, by suitable hoisting apparatus, placed upon a perfectly smooth table, and there, by means of saws cut up into cakes of the desired shape and size. Necessarily the hoisting and conveying apparatus has to be of great strength; the table upon which it rests, to be cut up, must be perfectly level, and must touch and support the large piece of ice at all points, otherwise the great weight of the ice will cause the ice to crack and break as chance dictates. Further the operation of sawing requires a long time, and uses up much power. The other method, that is the "block method", may be said to reside in means for cutting up the long piece of ice while it is in the water, and is frozen to the cooling surface. The cutting device usually employed is mounted upon wheels whereby it may be moved lengthwise of the piece, say from end to end. It consists of a hollow metal cutting member mounted to move vertically. Steam, by suitable pipe connections, passes through this member, heats it, and by reason of its own weight moves downward through the ice, melting and cutting the piece into the shape desired. This cutting member or blade consists of three integral members: the main member, for severing the block from the freezing surface, and the two end members at right angles to the main member, for cutting the sides of the block from the rest of the piece. After one block has been cut, the blade is raised, and moved along over the piece so that the main portion of the cutter or blade can cut the bottom of the next block from the ice on the metallic freezing surfaces, and also so that the one side of the next block can be cut by an end member when the cutting device decends. Obviously this is a very slow method of harvesting a big piece of ice. Live steam is required for the blade; the cold water, in which the ice is, absorbs great quantities of heat; the warm water remains at the top of the tank, and melts that portion of the ice into such form, that for the sake of appearances of the resulting blocks, the melted portions have to be cut off and thrown away; and further, before the water can be frozen during the next operation of freezing, the freezing liquid, as ammonia, or brine, has to remove this heat derived from the steam, before ice can be caused to form. In short, before the block ice is ready for use, there has been a loss in steam, ice, and cooling capacity in the freezing liquid.

Now one of the principal objects of my invention is to overcome the difficulties arising in harvesting ice by methods heretofore known, especially that used in the block system; and I accomplish this object by the use of metallic freezing surfaces for the formation of the ice, so arranged that what, if made under the old block system, would be a long single piece of ice to be cut into blocks, by a cutting device, is formed into a series of blocks of the desired size; each block being separated from its adjacent block by a removable metallic freezing surface. These freezing surfaces are provided with means whereby they may be subjected to a temperature above the freezing point, so that the ice will become detached from the freezing surfaces; and the removable surfaces may be removed from between the blocks; the latter are at once freed, and ready to be raised out of the water, and removed. In fine, instead of using, as heretofore, for example, a slow cutter employing steam, and fathering all the above objections, the blocks are frozen in the desired shape and size, the freezing surfaces are heated above freezing point, and the metallic, block separating surfaces are lifted up and away, as by hand, a quick and easy operation, and the blocks are ready for delivery.

Having described in a general manner the object of my invention, and the way I attain it, I will now show and describe the particular apparatus employed by me in carrying out the principle of my invention, and obtain also other objects which will be made plain hereinafter.

Figure 1 is a perspective view showing my invention embodied in apparatus for making and harvesting artificial ice. Fig. 2 is a plan showing particularly, the piping connections, and incidentally the tank and freezing surfaces. Fig. 3 is an elevation of the piping connections, a portion of the side of the water tank being broken away to show the cooling coils. Fig. 4 is an enlarged view of fragmentary details, showing a cooling coil, cooling surfaces, which include removable metallic cross cut devices, and means for securing said devices in position. Fig. 5 is a perspective view of one of said cross cut devices, the bottom portion of one side being broken away to show a partition within the device; while Fig. 6 is a section of device shown in Fig. 5.

The drawings illustrate the best mode of embodying my invention, now known to me.

A tank 1 is provided to contain ice forming surfaces, and the water to be frozen. It is made of any suitable material, as wood. Cooling coils 2, 3, 4, 5, are arranged lengthwise of the tank; coils 2 and 5 are adjacent to the sides of the tank and have longitudinal cooling surfaces 6, 7, respectively, while coils 3, 4, occupying the middle portion of the tank, have two longitudinal cooling surfaces, or plates, 8, 9 and 10, 11, respectively, that is, one cooling surface or plate on each side of each coil. Each coil stands in a vertical plane, and is held so, as by a long wooden member 12, Fig. 4, and two iron cooling surfaces as 8, 9, which inclose the coil, as 3, and are secured together in the manner shown in Fig. 4. Their bottom edges rest upon the floor of the tank, and by means of supporting pins 13, in the plates 8, 9, the cooling coils 3 are sustained between and in contact with the cooling plates 8, 9. Engaging the top edges of the plates 8, 9, and also lying between, but above the coil 3, is the long wooden member 12 extending the full length of the coil, and secured at each of its ends to the tank; the the vertical sides of the member being flush with the cooling surfaces of the plates, which are secured in position to said member, as by screws 15. The coil of pipe and the cooling plate are in contact so as to confine the intervening water, to serve as a medium, tending to equalize the distribution of the heat to the cooling plate during the process of harvesting, later to be described.

Cross cut devices 16, Figs. 1 and 4, are at predetermined distances apart, mounted at right angles to the cooling plates, as 8, 9, as by metallic hooked members 17, engaging metallic sockets 18, located above the longitudinal wooden member 12. Each of these cross cut devices 16, Figs. 4, 5, 6, consists of a metallic can, made of thin material, and having its sides 19 gradually converge towards the bottom. These sides are secured to the hooked member 17 which forms a top for the can. A transverse partition 20 extends from the top of the can nearly to the bottom, and divides the can into two compartments connected at the bottom. Opening through the top 17 and into each compartment, is a hole 21, for introducing into or emptying from, the can 16, water above the temperature of freezing. Between these sockets 18, is a wooden member 22, secured to the top of the member 12, to which the plates as 8, 9, are fixed. It will be noticed that the tops of the cans 16, the socket members 18, and the wooden member 22, are all in one plane, so that covers 23, Fig. 1, can be freely moved from place to place over the tank. Where there are two freezing plates, as 8, 9, for each coil, as 3, above described, each plate is preferably supplied with as many cross cut devices 16, as is desirable. Preferably they are mounted in pairs, as shown in Fig. 4, each socket member 18 being adapted for such mounting. Where the coil, as 2, is adjacent to one side of the tank, or where only one cooling surface is desired for a coil, then the construction is substantially that shown in Fig. 4, after one cooling plate, and its coöperating cans and sockets have been removed. A description of the exact construction involved seems unnecessary, and is therefore omitted.

The cooling coils 2, 3, 4, 5, Fig. 1, have inlet ends 24, 25, 26, 27, and outlet ends 28, 29, 30, 31, which extends through the tank, in suitable packings; the inlet ends connecting with an inlet header 32, and the outlet ends connecting with an outlet header 33; all of the inlet end portions being provided with valves 34, 35, 36, 37, and all of the outlet ends with valves 38, 39, 40, 41. Access to this inlet header 32 is controlled by a valve 42, while the outlet header 33 is controlled by an outlet valve 43. A hot gas pipe 44, controlled by a valve 45, leads into a hot gas header 46, which in turn, is connected by branch pipes 47, 48, 49, 50, to the inlet ends of the coils 2, 3, 4, 5, between the tank and the inlet valves 34, 35, 36, 37, respectively. In these branch pipes are valves 51, 52, 53, 54. A similar hot gas header 55 is similarly connected with the outlet ends of the coils 2, 3, 4, 5, by branch pipes 56, 57, 58, 59, having valves 60, 61, 62, 63, therein. This header 55 is connected to the hot gas inlet pipe 44, by a pipe 65, having a valve 64 therein. For the purpose of having auxiliary means for pumping out any one of the coils independently of the other coils, these hot gas headers 46, 55, are connected by a bend 66, in which are two valves 67, 68 and a pump out pipe 69 connected to the bend between said valves 67 and 68. The coils 2, 3, 4, 5, are located at such a distance apart that when the cross cut devices 16, are in position, there is an alleyway 70, Fig. 1, formed between the parallel lines of cross cuts 16, for the flotation of free blocks of ice.

The refrigerant to be employed in the operation of freezing is assumed to be anhydrous ammonia. It is supplied under pressure from a suitable condenser, to the inlet header 32; and is withdrawn through the outlet header 33, connected by suitable connections as to the suction side of a compression machine. The hot gas is supplied to either one or both of the hot gas headers 46, 55, direct from the compression side as of a compressor, without first passing through a condenser. The pump out pipe 69 is connected as to the suction side of a compressor. As any refrigerating machine may be used, and further as they are well understood and form no part of my invention, a description and an illustration of such a machine is omitted.

The operation of my invention will now be described.

Cold anhydrous ammonia under pressure is supplied from the condenser to the inlet header 32. All of the inlet valves 34, 35, 36, 37, being open, all of the valves 51, 52, 53, 54, in the branch pipes 47, 48, 49, 50, and all the outlet valves 38, 39, 40, 41, and valves 60, 61, 62, 63, in branch pipes 56, 57, 58, 59, being closed, the coils 2, 3, 4, 5, are consequently filled full of cold liquid ammonia under pressure. All the inlet valves 34, 35, 36, 37, are now closed, and the outlet valves 38, 39, 40, 41, are opened slightly until the pressure in the coils 2, 3, 4, 5, is reduced enough to permit the ammonia to begin to boil. Refrigeration begins at once. All the coils begin to absorb the heat from the surrounding water; the water between the coils and the cooling plates, being cooled, absorbs the heat from the metal plates substantially uniformly, and the plate becomes uniformly cool, and cold and colder; and when the film of water in contact with the plate or plates, falls below the freezing point, it becomes ice fixed to the plate. But as the cross cut devices 16 are of thin metal, are the best of heat conductors, and are in contact with their respective plates, as 8, 9, they assume practically the temperature of the plates. Ice consequently begins to form also upon the surfaces 19 of the cross cuts 16 contacting the plate. All of the coils are now assumed to be starting the making of ice; as, above stated, the pressure in each coil 2, 3, 4, 5, being reduced as required, by the gradual flow of the ammonia gas through the outlet valves 38, 39, 40, 41, and into the header 33. If for any reason at this time, it is necessary to stop using say, the side coil 2, because it has, for example, begun to leak, then this coil can be cut out of the freezing system, and the ammonia in the injured coil may be recovered, as in the following manner. The inlet valve 34 and the outlet valve 38 are closed, the valves 60, 67, or 51, 68, or all four are opened so that pump out pipe 69 is in open communication with the coil 2, and the suction side, as of a compression machine, not shown. When the ammonia has by this means been recovered from the injured coil 2, then the said valves are closed, and the coil, 2, being free from ammonia, can be repaired with safety. Meanwhile, ice has been forming upon the remaining coils 3, 4, 5, say, to the extent indicated upon coil 3, in Fig. 1. If it happens to be of the thickness desired, then it can be harvested at once; while the ice forming upon coils 4 and 5, may, for example be allowed to continue freezing to obtain greater thickness.

To harvest the ice formed by the coil 3, the first step is to stop refrigeration due to the vaporization of the ammonia in said coil. The inlet valve 35 and the outlet valve 39 are closed and the liquid is consequently confined in the coil, at a back pressure; the liquid ceases vaporizing, and hence to do refrigeration. It is then allowed to stand for about an hour to permit the ice to temper. The next step is to disengage the ice from the freezing surfaces. The outlet valve 39 is slightly opened, the hot gas under compression pressure is allowed to flow into the coil and drive the liquid ammonia left in the coil, out of it and into the return main, from which it is recovered in any suitable manner. The hot gas from the compressor, at a compressor pressure, instead of being led to, and condensed in, its usual condenser, flows directly into the coil 3, through the hot gas pipe 44, its valve 45, through the hot gas header 46, and valve 52 in the branch pipe 48 leading from the hot gas header to the coil 3. During the introduction of the hot gas into the coil the outlet valve 39 is opened just enough to permit the hot gas to fill the coil 3, and circulate therethrough; the hot gas under compressor pressure, raising the pressure in coil 3, and also the temperature above freezing point of the water. The surrounding water assumes the same temperature, and the plates 8, 9, practically uniformly become to be of the same temperature, and the films of ice attaching the blocks to the plates begin to melt. About the time when the hot gas is introduced into the coil, hot water is poured into one hole 21, Figs. 4, 5, 6, in each of the cross cut devices 16, Fig. 1, until the can on each side of the partition 20, Figs. 5, 6, is full. In the course of a few moments, each block of ice becomes detached from the plates 8, 9, and the contacting cross cuts 16, so that by lifting up the cross cuts by their handles 71, the tapering sides 19, Figs. 5 and 6, of the cross cuts permitting so doing; the blocks of ice are freed, rise to the top of the water, as shown in the adjacent alley way 70, between coils 4 and 5. The ice cakes can then be floated to a spot convenient to some hoisting device for delivering the ice in any suitable manner. The harvesting of this crop of ice formed by the coil 3 upon each of its plates 8, 9, is thus completed.

Now after the ice is freed, the hot gas is shut off, and the coil remains idle until another crop of ice is desired; a certain amount of liquid, that is, the condensed hot gas, lying in the coil. To begin refrigeration, to make another crop of ice, the outlet valve 39 is slightly opened; the pressure in the coil becomes reduced to the running back pressure employed; the cold liquid expands in the coil, vaporizes, and refrigeration begins at once; it being understood that to continue refrigeration, the inlet valve is opened enough to keep up the flow of the proper amount of liquid into the coil. In fine, by means of my invention, the liquid in a coil, after it has melted off the ice from the plate, is ready to do refrigeration; and the liquid does not as formerly, have to be removed from the coil, and a new quantity of freezing liquid be introduced into the coil, for making the next ice crop.

We will now assume that the ice formed by the coil 4, is of sufficient thickness and must be harvested. The same operation takes place as did in connection with harvesting the crop on coil 3. Inlet valve 36 and outlet valve 40 are closed. Hot gas is let in through valve 53 in pipe 49, leading from the hot gas header 46, to the coil 4; or as is sometimes advisable, the hot gas may be allowed to enter the top of the coil 4, as through pipe 65, header 55, branch pipe 58 and valve 62. After the ice from coil 4 has been harvested, if for any reason it is desirable to recover the ammonia in the coil without interfering with the circulation of ammonia to or from the other coils, say coil 5, then it can be recovered through the pump out pipe 69 and either of the connecting hot gas headers 46, 55, by closing valves 64, 45, and by opening valves 62, 67, or valves 53, 68, or all four, in the manner already described, to pump out coil 2.

Now to harvest the ice formed by the coil 5 and recover its ammonia, needs no further explanation. The methods employed with the coils 3 and 4, and already described, may be repeated in connection with coil 5.

It will now be plain that each coil is absolutely independent of each other coil; that any one or more can do refrigeration, can be pumped out, or can be harvested, while another is engaged in a different operation. Further, it is obvious that by means of the cross cuts, the plates and adjacent coil, the ice piece may be formed into blocks of convenient sizes, and quickly and easily harvested; that the surfaces of the blocks in contact with the cooling plates and cross cuts are smooth and in one plane, and, in operation of harvesting, are not disfigured by the unequal distribution of heat to the plates; and that the construction and the arrangement of the parts employed in the manufacture of the ice, are simple, suitable and most convenient for use.

To show the great utility of this invention, I will state that to harvest twenty-eight cakes of ice of five hundred pounds each by the "block system" requires two men about one hour and a half, while by my invention, one man harvests the same number of cakes of the same weight in about twenty-five minutes.

Desiring to protect my invention and the various features thereof in the broadest manner legally possible, what I claim is:—

1. A hollow cross cut device, used in making artificial ice, comprising a cam having converging ice forming surfaces; means for removably securing the said cross cut device in contact with an ice forming plate of an ice machine; openings in the top portion of the can for the introduction of a warm medium into the can to melt off any film of ice contacting said surface; a partition dividing the interior of the can into two vertical chambers connected at or near to the bottom of the can.

2. In an ice machine, a water tank; two or more cooling coils therein; metallic plates adjacent to said coils; an inlet header connected to said coils; an outlet header connected to said coils; a hot gas header; branch pipes connecting said hot gas header with said coils; inlet valves to said coils; outlet valves to said coils; valves in said branch pipes; a valve to control the hot gas header; a pump out pipe connected with said hot gas header, and a valve to control said pump out pipe.

In testimony whereof I affix my signature in presence of two witnesses.

THOMAS H. RAY.

Witnesses:
 F. J. V. DAKIN,
 E. F. UNIAC.